Jan. 22, 1963 J. C. MEYER 3,074,766
SHOCK RESISTING SUPPORT FOR SLIDE STRUCTURE
FOR DRAWERS, SHELVES AND THE LIKE
Filed Aug. 22, 1960
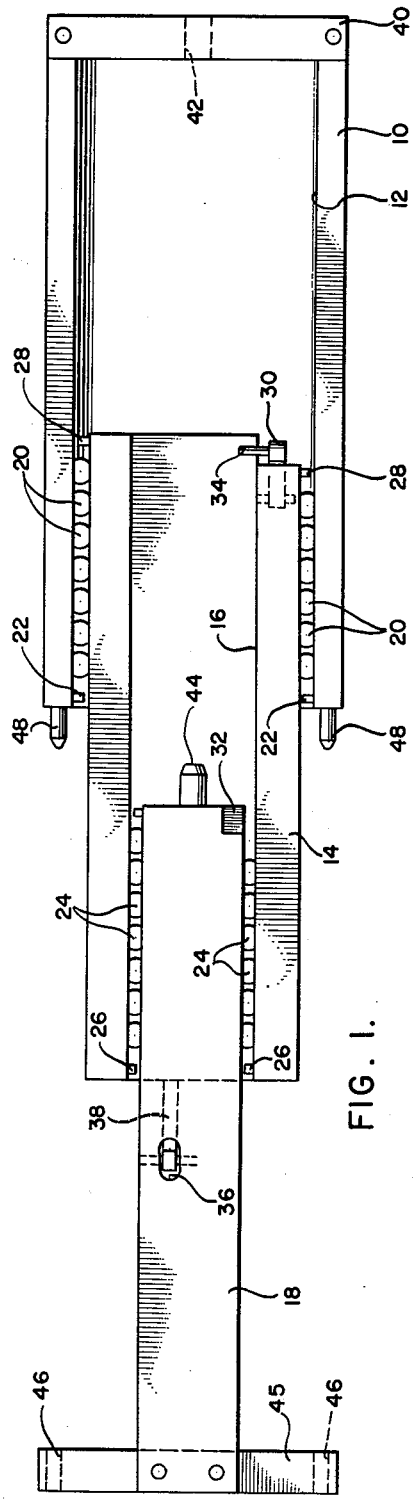
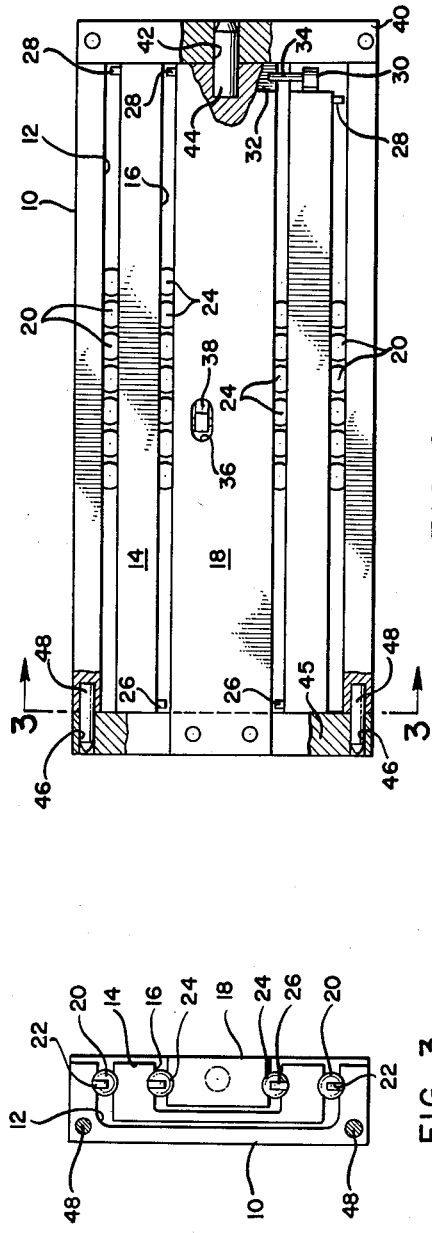
FIG. 1.
FIG. 2.
FIG. 3.
*INVENTOR.*
JOHN C. MEYER
BY *Lyon & Lyon*
ATTORNEYS

United States Patent Office

3,074,766
Patented Jan. 22, 1963

3,074,766
SHOCK RESISTING SUPPORT FOR SLIDE STRUCTURE FOR DRAWERS, SHELVES AND THE LIKE
John C. Meyer, Fullerton, Calif., assignor to Jonathan Manufacturing Company, Fullerton, Calif., a corporation of California
Filed Aug. 22, 1960, Ser. No. 51,193
6 Claims. (Cl. 308—3.8)

This invention relates to an improved shock and vibration resisting support for a slide support for drawers and the like.

In missile ground systems and similar installations, various electronic components are housed within a cabinet. Such components are mounted upon a sliding support so that the component may be pulled out of the cabinet in much the same manner as a drawer. The slide or support mechanisms are secured on each side of the component and also the cabinet and in the usual practice comprise three telescoping members with suitable ball bearings therebetween. Such systems are subject to shock by virtue of being moved by truck, ship or aircraft and are subject to same when under bombing attack. Also a resonant frequency may be set up during operation of the equipment itself. Further such shock and vibration are frequently amplified by the structure.

It is therefore an object of this invention to provide means for locking the three piece slide mechanism when the electronic component is within the cabinet to eliminate amplification of shock.

Further it is an object to prevent Brinelling of the ball bearings into the ball races by virtue of shock or vibration.

Still a further object of this invention is to prevent any opening up of the slide members under shock or vibration.

Other objects and advantages of this invention will be readily apparent from the following description.

In the drawings:

FIGURE 1 is a side elevation of a slide mechanism embodying this invention in the open position.

FIGURE 2 is a view similar to FIGURE 1 with the device in a closed position.

FIGURE 3 is a view taken along line 3—3 of FIGURE 2.

In the slide mechanism the outer or stationary member 10 is rigidly fixed by screws or the like on the inside of a suitable cabinet. There is a slide mechanism on each side of the cabinet for each electronic component; however, since they are identical only one is illustrated and will be described.

The member 10 has a slot or channel 12 extending the length thereof which slidably receives the remainder of the slide mechanism. An inner slide member 14 is formed with a longitudinal slot or channel 16 extending the length thereof which telescopically receives a third member 18 which is rigidly secured by screws or the like to the base of the electronic component being supported. The opposed flanges of member 10 forming channel 12 and the upper and lower surfaces of intermediate member 14 are grooved to form a race for ball bearings 20. Pins 22 in channel 12 prevent escape of the balls.

Similarly the flanges of member 14 and the upper and lower surfaces of the third member are grooved to form a race for ball bearings 24 and pins 26 on member 14 prevent their escape.

The intermediate member 14 likewise carries pins 28 to confine balls 20 and member 18 carries pins 28 to confine balls 24.

The intermediate member 14 carries a spring loaded catch 30 having a protuberance thereon which projects into a suitable hole in member 10 when the intermediate member is fully withdrawn to latch same in this position. The outer or third member 18 has a cam surface 32 which engages pin 34 and cams latch 30 free upon moving the member 18 back into the cabinet.

Similarly member 18 has a slot 36 therethrough which houses a spring loaded latch 38 which pivots outwardly when free of member 14 and abuts the end thereof preventing return of the member 18 into the cabinet until the latch member 38 is manually depressed. Pins 26 and 22 function further to limit outward movement of the members 14 and 18.

A stainless steel shock block 40 is fixed to the innermost extremity of member 10 across channel 12 having a bore 42.

Similarly a shock block 45 is carried by the outer extremity of member 18 having a pair of bores 46 therethrough. The outermost extremity of member 10 carries a pair of pins 48 adapted to enter bores 46 when the slide mechanism is in the closed position of FIGURE 2.

The pins 44 and 48 have a very close tolerance fit with their respective bores 42 and 46 so that in effect when the slide members are tightly together they are almost a single structure for shock and vibration purposes which are transmitted directly from member 10 to member 18 eliminating any amplification thereof.

While what hereinbefore has been described as the preferred embodiment of this invention, it is readily apparent that alterations and modifications may be resorted to without departing from the scope of this invention and such alterations and modifications are intended to be included within the scope of the appended claims.

I claim:

1. A slide mechanism comprising a series of telescoping slide members, the outermost member carrying a shock block, the innermost member carrying a second shock block, a pin and bore connection between the innermost member and the shock block carried by said outermost member, and a pin and bore connection between said outermost member and the shock block carried by said innermost member.

2. A slide mechanism comprising a series of telescoping slide members, the outermost member carrying a shock block, the innermost member carrying a second shock block, a pin and bore connection between the innermost member and the shock block carried by said outermost member, and a pin and bore connection between said outermost member and the shock block carried by said innermost member, said pins having a close tolerance fit with said bores.

3. A slide mechanism comprising a series of telescoping slide members, the outermost member carrying a shock block, the innermost member carrying a second shock block, a pin and bore connection between the innermost member and the shock block carried by said outermost member, and a pin and bore connection between said outermost member and the shock block carried by said innermost member, and bearing elements between said slide members.

4. A slide mechanism comprising at least two telescoping slide members, a shock block carried by the innermost member and a pin and bore connection between said shock block and the outermost member.

5. A slide mechanism comprising at least two telescoping slide members, a shock block carried by the outermost member and a pin and bore connection between said shock block and the innermost member.

6. A slide mechanism comprising at least two telescoping slide members, a shock block carried by one of said members and a pin and bore connection between said shock block and another of said members.

References Cited in the file of this patent
UNITED STATES PATENTS

| | | |
|---|---|---|
| 2,801,887 | Gussack | Aug. 6, 1957 |
| 2,926,048 | Gussack | Feb. 23, 1960 |